(12) United States Patent
Nakamura

(10) Patent No.: US 11,334,305 B1
(45) Date of Patent: May 17, 2022

(54) WIRELESS TAG COMMUNICATION DEVICE, IMAGE FORMING APPARATUS, AND CONTROL METHOD

(71) Applicant: TOSHIBA TEC KABUSHIKI KAISHA, Tokyo (JP)

(72) Inventor: Koki Nakamura, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/092,953

(22) Filed: Nov. 9, 2020

(51) Int. Cl.
*G06K 17/00* (2006.01)
*G06F 3/12* (2006.01)
*H01Q 1/22* (2006.01)
*G06K 7/00* (2006.01)
*G06K 7/10* (2006.01)

(52) U.S. Cl.
CPC .......... *G06F 3/1292* (2013.01); *G06F 3/1236* (2013.01); *G06K 7/0008* (2013.01); *G06K 7/10* (2013.01); *H01Q 1/2216* (2013.01)

(58) Field of Classification Search
CPC ...... G06F 3/1292; G06K 7/0008; G06K 7/10; G06K 17/0025; G06K 19/07718; G06K 19/0776; H01Q 1/2216; B41J 3/36; B41J 3/4075
See application file for complete search history.

(56) References Cited

U.S. PATENT DOCUMENTS

| 7,341,326 | B2  | 3/2008 | Kondo et al. | |
| 7,992,791 | B2* | 8/2011 | Fukui | G06K 17/0025 235/492 |
| 2005/0021172 | A1* | 1/2005 | Winter | G06K 19/077 700/228 |
| 2012/0081747 | A1* | 4/2012 | Kobayashi | B41J 3/4075 358/1.15 |
| 2013/0285798 | A1* | 10/2013 | Koike | G06K 7/10009 340/10.51 |
| 2020/0293845 | A1* | 9/2020 | Murayama | G06K 1/20 |

FOREIGN PATENT DOCUMENTS

| JP | 2005059577 A | 3/2005 |
| JP | 2005128867 A | 5/2005 |
| JP | 2006331211 A | 12/2006 |
| JP | 2008090770 A | 4/2008 |

* cited by examiner

*Primary Examiner* — Munear T Akki
(74) *Attorney, Agent, or Firm* — Kim & Stewart LLP

(57) ABSTRACT

A wireless tag communication device includes a communication interface device configured to communicate with a wireless tag attached to or included in a sheet conveyed along a conveyance direction in a printer, and a controller configured to acquire light reception information indicating a time period in which light emitted towards the sheet has been blocked by the wireless tag during conveyance of the sheet, compare the acquired light reception information to reference information and determine a direction of the wireless tag with respect to the conveyance direction, determine a polarization direction of a radio wave to be transmitted to the wireless tag based on the determined orientation direction of the wireless tag, and control the communication interface device to transmit to the wireless tag the radio wave having the determined polarization direction.

20 Claims, 8 Drawing Sheets

FIG. 4
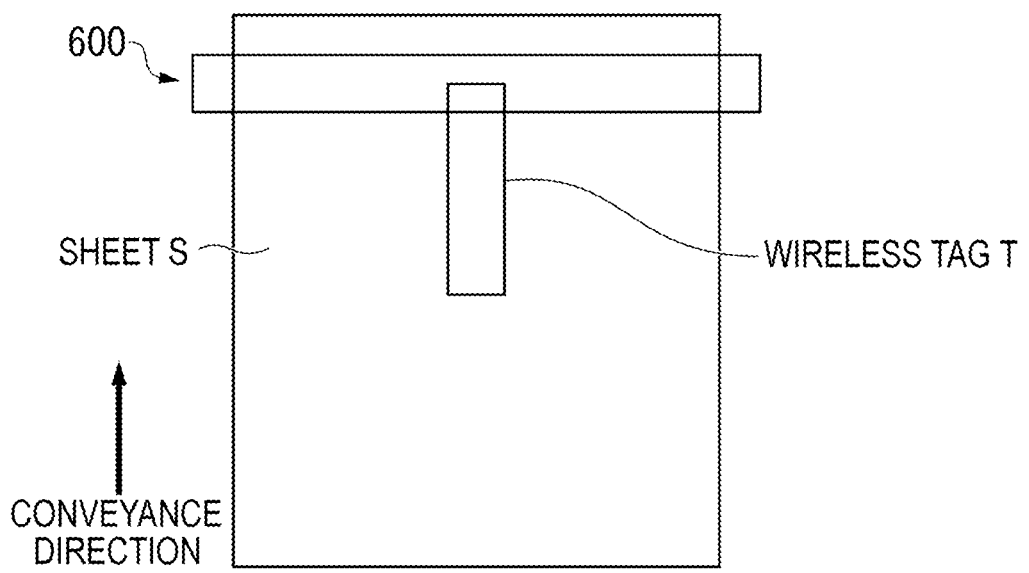
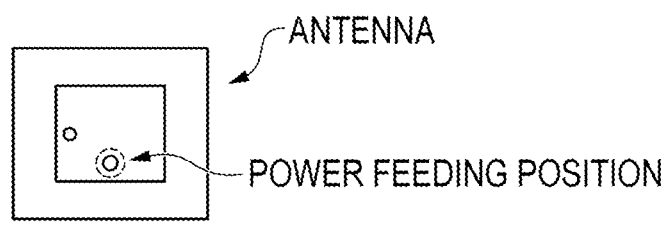

TIME SERIES INFORMATION

| 1 | S1 |
| 2 | S2 |
| 3 | S3 |
| 4 | S4 |
| 5 | S5 |
| 6 | S6 |
| ... | ... |
| n | Sn |

REFERENCE INFORMATION

| 1 | V1 |
| 2 | V2 |
| 3 | V3 |
| 4 | V4 |
| 5 | V5 |
| 6 | V6 |
| ... | ... |
| n | Vn |

LIGHT BLOCKING TIME INFORMATION

| Ts |

REFERENCE INFORMATION

| Ta |

WIRELESS TAG COMMUNICATION DEVICE, IMAGE FORMING APPARATUS, AND CONTROL METHOD

FIELD

Embodiments described herein relate generally to a wireless tag communication device, an image forming apparatus, and a control method.

BACKGROUND

There is an image forming apparatus capable of forming an image on a sheet on which a wireless tag is also provided. Such an image forming apparatus has a wireless tag communication device that communicates with the wireless tag provided on the sheet. The wireless tag communication device is capable of writing information in the wireless tag or reading information from the wireless tag while the sheet is being conveyed in the image forming apparatus.

The wireless tag communication device is required to transmit radio waves to the wireless tag with an appropriate polarization direction that may vary depending on the orientation of the antenna in the wireless tag on the sheet.

Thus, there is a technology in which an additional device is utilized for detecting the appropriate polarization direction. With such a technology, the wireless tag communication device can write information to the wireless tag by emitting radio signals with the polarization direction that has been determined by the additional device.

BRIEF DESCRIPTION OF THE DRAWINGS

FIG. 4 is a diagram illustrating a positional relation between a sheet, a photoelectric device, and a wireless tag.

DETAILED DESCRIPTION

In general, according to an embodiment, a wireless tag communication device includes a communication interface device configured to communicate with a wireless tag attached to or included in a sheet conveyed along a conveyance direction in a printer. The wireless tag communication device further includes a controller configured to acquire light reception information indicating a time period in which light emitted towards the sheet has been blocked by the wireless tag during conveyance of the sheet. The controller is further configured to compare the acquired light reception information to reference information and determine a direction of the wireless tag with respect to the conveyance direction. The controller is further configured to determine a polarization direction of a radio wave to be transmitted to the wireless tag based on the determined orientation direction of the wireless tag. The controller is further configured to control the communication interface device to transmit to the wireless tag the radio wave having the determined polarization direction.

Figure 1:
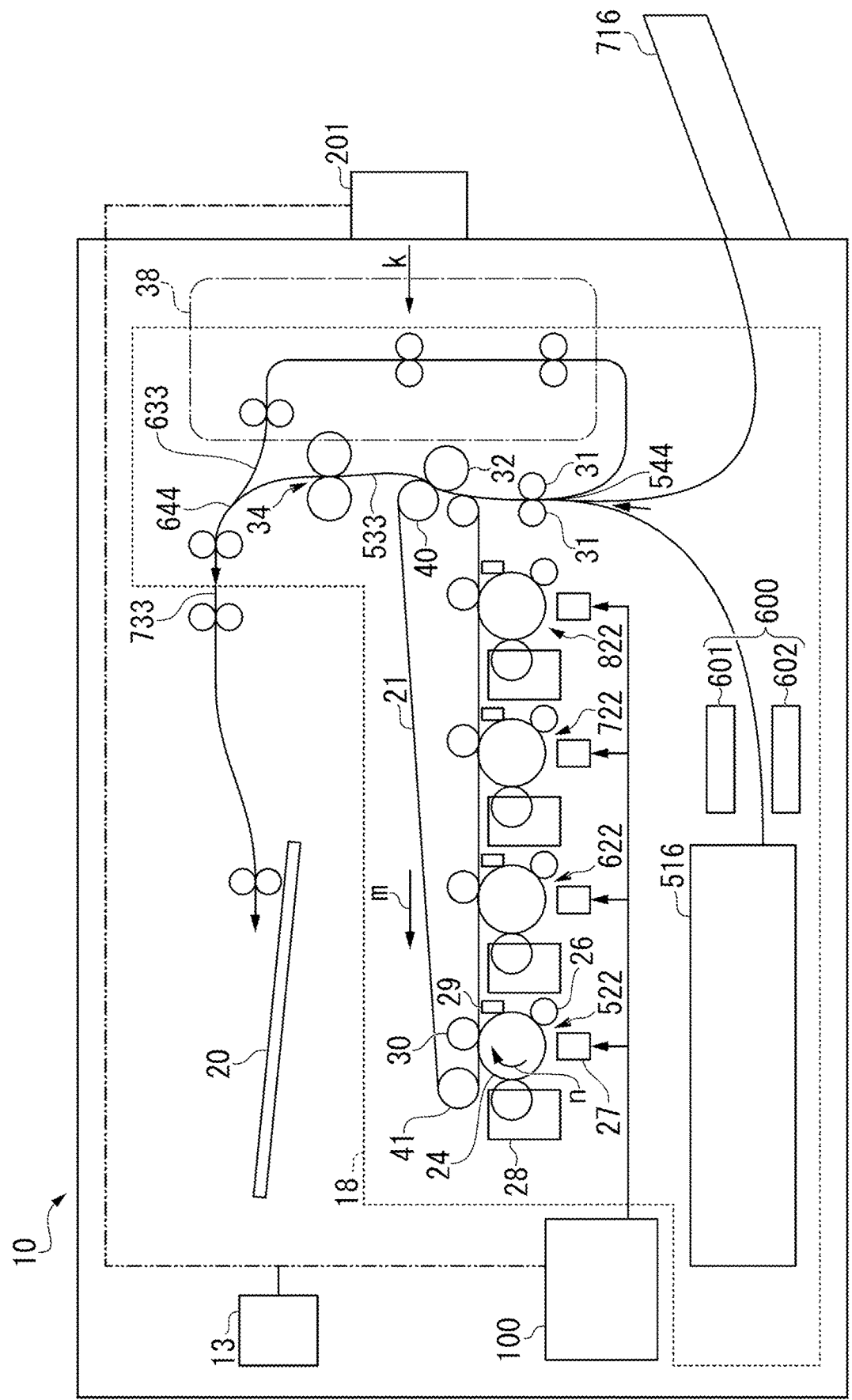
FIG. 1 is a side view illustrating an image forming apparatus according to an embodiment.

FIG. 1 is a side view illustrating an image forming apparatus 10 according to an embodiment. The image forming apparatus 10 includes a control panel 13, a wireless tag communication device 201, an image forming control unit 100, and a printer unit 18. The printer unit 18 includes a paper feed cassette 516, a photoelectric device 600, and the like. The photoelectric device 600 includes a light transmitting unit 601 and a light receiving unit 602. Details of the light transmitting unit 601 and the light receiving unit 602 will be described later. The image forming control unit 100 controls the control panel 13 and the printer unit 18. The image forming control unit 100 controls conveyance of a sheet in the printer unit 18. The control of the conveyance of a sheet includes a control of a conveyance timing of the sheet, a stop position of the sheet, a conveyance speed of the sheet, and the like.

The control panel 13 includes an input key or button and a display unit. For example, the input key receives an input by a user. For example, the display unit is a touch panel display. The display unit receives an input by the user and displays information for the user. For example, the control panel 13 allows the user to change settings relating to the operation of the image forming apparatus 10. The control panel 13 notifies the image forming control unit 100 of the settings made by the user.

The paper feed cassette 516 stores a sheet on which a wireless tag is provided. The paper feed cassette 516 is capable of also storing a sheet on which the wireless tag is not provided. In the following description, the sheet means a sheet on which the wireless tag is provided unless otherwise described. For example, a material such as paper and a plastic film is used for the sheet.

The printer unit 18 performs an image forming operation. For example, the printer unit 18 forms an image on a sheet according to image data. In the following description, forming an image on a sheet is expressed as printing. The printer unit 18 includes an intermediate transfer belt 21. In the printer unit 18, a driven roller 41, a backup roller 40, and the like support the intermediate transfer belt 21. In the printer unit 18, the intermediate transfer belt 21 is rotated in a direction indicated by an arrow m in FIG. 1.

The printer unit 18 includes four sets of image forming units 522, 622, 722, and 822. The image forming units 522, 622, 722, and 822 are used for forming images of Y (yellow), M (magenta), C (cyan), and K (black), respectively. The image forming units 522, 622, 722, and 822 are arranged below the intermediate transfer belt 21, in the rotation direction of the intermediate transfer belt 21.

The Y (yellow) image forming unit 522 among the image forming units 522, 622, 722, and 822 will be described below as an example. The configuration of the image forming units 622, 722, and 822 are similar to the one of the image forming unit 522.

The image forming unit 522 includes a charging unit 26, an exposure scanning head 27, a developing device 28, and a cleaning unit 29. The charging unit 26, the exposure scanning head 27, the developing device 28, and the cleaning unit 29 are disposed around a photosensitive drum 24 that rotates in a direction indicated by an arrow n.

The image forming unit 522 includes a primary transfer roller 30. The primary transfer roller 30 opposes the photosensitive drum 24 with the intermediate transfer belt 21 interposed between the photosensitive drum 24 and the primary transfer roller 30.

In the image forming unit 522, the photosensitive drum 24 is electrified by the charging unit 26 and then is exposed by the exposure scanning head 27. The image forming unit 522 forms an electrostatic latent image on the photosensitive drum 24. The developing device 28 develops the electrostatic latent image on the photosensitive drum 24 with a two-component developer formed with a toner and a carrier.

The primary transfer roller 30 primarily transfers the toner image formed on the photosensitive drum 24 to the intermediate transfer belt 21. The image forming units 522, 622, 722, and 822 form a color toner image on the intermediate transfer belt 21 by the primary transfer roller 30. The color toner image is formed by sequentially superimposing toner images of Y (yellow), M (magenta), C (cyan), and K (black). The cleaning unit 29 removes the toner remaining on the photosensitive drum 24, after the primary transfer.

The printer unit 18 includes a secondary transfer roller 32. The secondary transfer roller 32 opposes the backup roller 40 with the intermediate transfer belt 21 interposed between the secondary transfer roller 32 and the backup roller 40. The secondary transfer roller 32 collectively performs secondary transfer of the color toner image on the intermediate transfer belt 21 to the sheet. In the following description, "toner image" may refer to a color toner image or a monochrome toner image. In some examples, the toner image may be formed with a decolorable toner.

A conveyance path 533 is a conveyance path of a sheet from a confluence portion 544 to a branch portion 644. A conveyance path 633 is a conveyance path of the sheet passing in a double-sided printing device 38 from the branch portion 644 to the confluence portion 544. A conveyance path 733 is a conveyance path of the sheet from the branch portion 644 to a paper output tray 20.

The leading edge of the sheet which has been picked up from the paper feed cassette 516 or a manual feed tray 716 abuts against a meeting of two registration rollers 31 which are in contact with each other (also referred to as a nip portion or position for the two registration rollers 31). The position of the sheet abutting on the registration roller 31 is corrected (sheet leading edge is aligned appropriately). The image forming control unit 100 starts rotation of the registration rollers 31 to match (synchronize) with the position of the toner image on the rotating intermediate transfer belt 21 to move the sheet to the position of the secondary transfer roller 32 at an appropriate timing. The image forming control unit 100 causes the secondary transfer roller 32 to transfer the toner image from the intermediate transfer belt 21 to the sheet. The image forming control unit 100 conveys the sheet along the conveyance path 533 and causes a fixing device 34 to fix the toner image on the sheet. The image forming control unit 100 conveys the sheet on which the image has been formed along the conveyance path 733 to output the now-printed sheet.

For double-sided printing, the image forming control unit 100 conveys the sheet on which an image has been formed on one surface (first surface), along the conveyance path 733. After the entire sheet has passed along the branch portion 644, the image forming control unit 100 switches the sheet back (reverses travel direction) and conveys the sheet along the conveyance path 633. Then, the sheet is conveyed to the confluence portion 544 through the conveyance path in the double-sided printing device 38 and then along the conveyance path 533 with the passing of the registration rollers 31. Another toner image is then transferred to the back surface (second surface) of the sheet. Then, the image forming control unit 100 causes the fixing device 34 to fix the other toner image to the sheet, thereby forming an image on the back surface of the sheet. The image forming control unit 100 conveys the now twice-printed sheet along the conveyance path 733 for outputting the sheet.

The wireless tag communication device 201 is capable of communicating with the image forming control unit 100. The wireless tag communication device 201 also communicates with the wireless tag of the sheet to read information from the wireless tag or write information in the wireless tag. In an embodiment, the wireless tag is a radio frequency identifier (RFID) tag. The wireless tag communication device 201 transmits a radio wave in a direction indicated by an arrow k in FIG. 1. The wireless tag communication device 201 is capable of communicating with the image forming control unit 100 using radio waves in two different polarization directions.

Before the image formed in the printer unit 18 is transferred to the sheet at the secondary transfer roller 32, the electrostatic latent image is first formed on the photosensitive drum 24 from the exposure scanning head 27. The electrostatic latent image formed on the photosensitive drum 24 is developed then transferred to the intermediate transfer belt 21 as a toner image. The toner image which is first transferred to the intermediate transfer belt 21 is subsequently transferred from the intermediate transfer belt 21 to the sheet at the secondary transfer roller 32.

Next, a functional block description of the image forming apparatus in an embodiment will be described with reference to FIG. 2.

Figure 2:
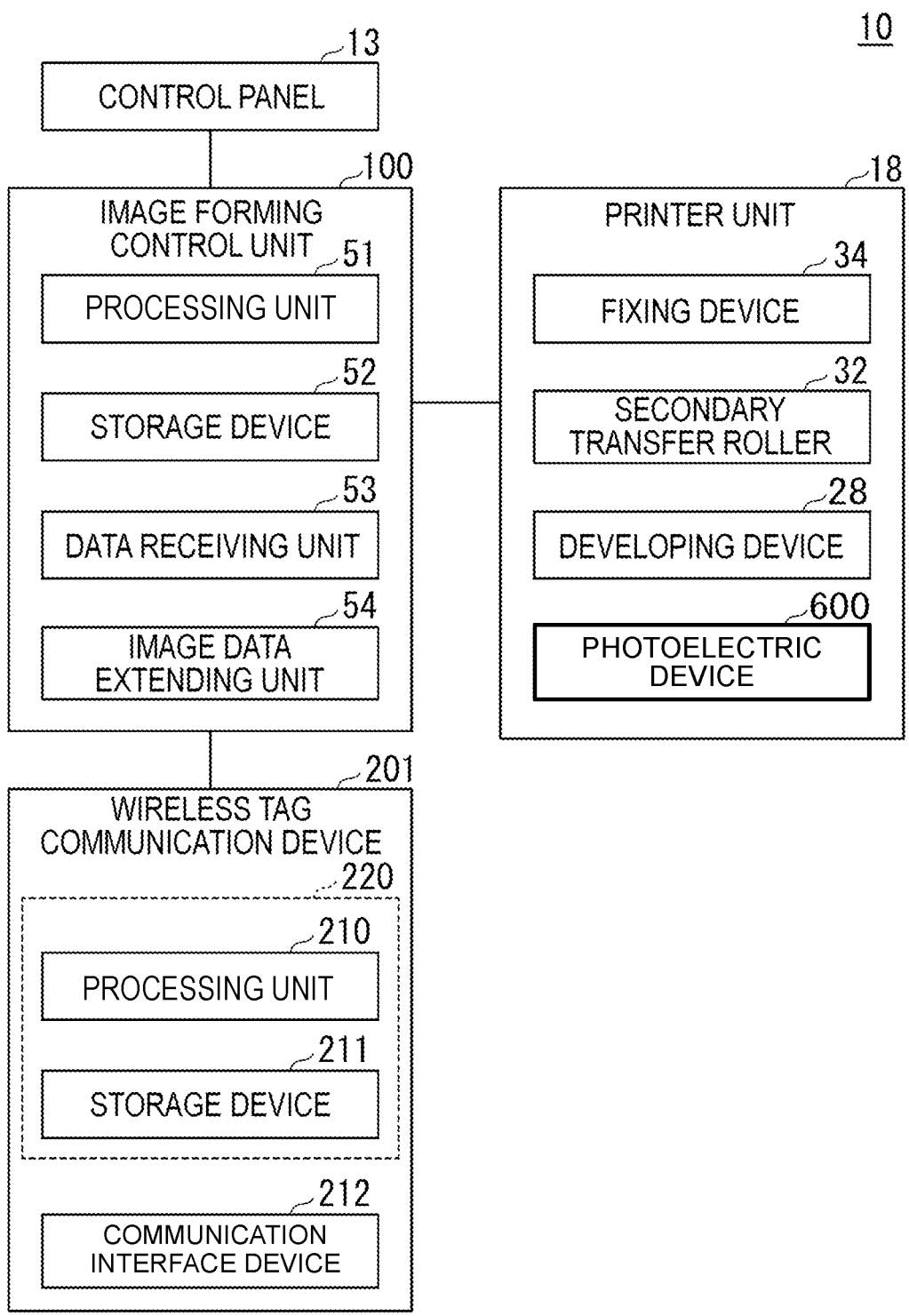
FIG. 2 is a functional block diagram of an image forming apparatus and a wireless tag communication device according to an embodiment.

In FIG. 2, the image forming apparatus 10 includes the image forming control unit 100, the control panel 13, the printer unit 18, and the wireless tag communication device 201.

The image forming control unit 100 includes a processing unit 51 and a storage device 52. The processing unit 51 controls the control panel 13, the printer unit 18, and the wireless tag communication device 201 according to an image processing program stored in the storage device 52.

The processing unit 51 is a central processing unit (CPU) or an application specific integrated circuit (ASIC), for example. The storage device 52 includes a read only memory (ROM), a random access memory (RAM), a hard disk drive (HDD), a solid state drive (SSD), and the like. A data interface unit 53 receives printing data (for example, data described in a page description language) indicating an image to be printed, from a host such as a personal computer (PC). The received printing data is stored in the storage device 52. For example, an image data extending circuit 54 determines a printing condition from the printing data stored in the storage device 52 and converts the printing data to data (for example, raster data) which can be used by the printer unit 18. Then, the image data extending circuit 54 stores the data in the storage device 52.

The printer unit 18 includes the fixing device 34, the secondary transfer roller 32, and the developing device 28. The printer unit 18 forms an image on the sheet based on data stored in the storage device 52 by the image data extending circuit 54.

The wireless tag communication device 201 includes a tag control unit (or a tag controller) 220 and a communication interface device 212. The tag control unit 220 includes a processing unit 210 and a storage device 211. The processing unit 210 is a central processing unit (CPU) or an application specific integrated circuit (ASIC), for example. The storage device 211 includes a read only memory (ROM), a random access memory (RAM), and the like. The storage device 211 stores an ID for identifying a wireless tag. The communication interface device 212 acquires information from the wireless tag or writes information in the wireless tag.

Figure 3:
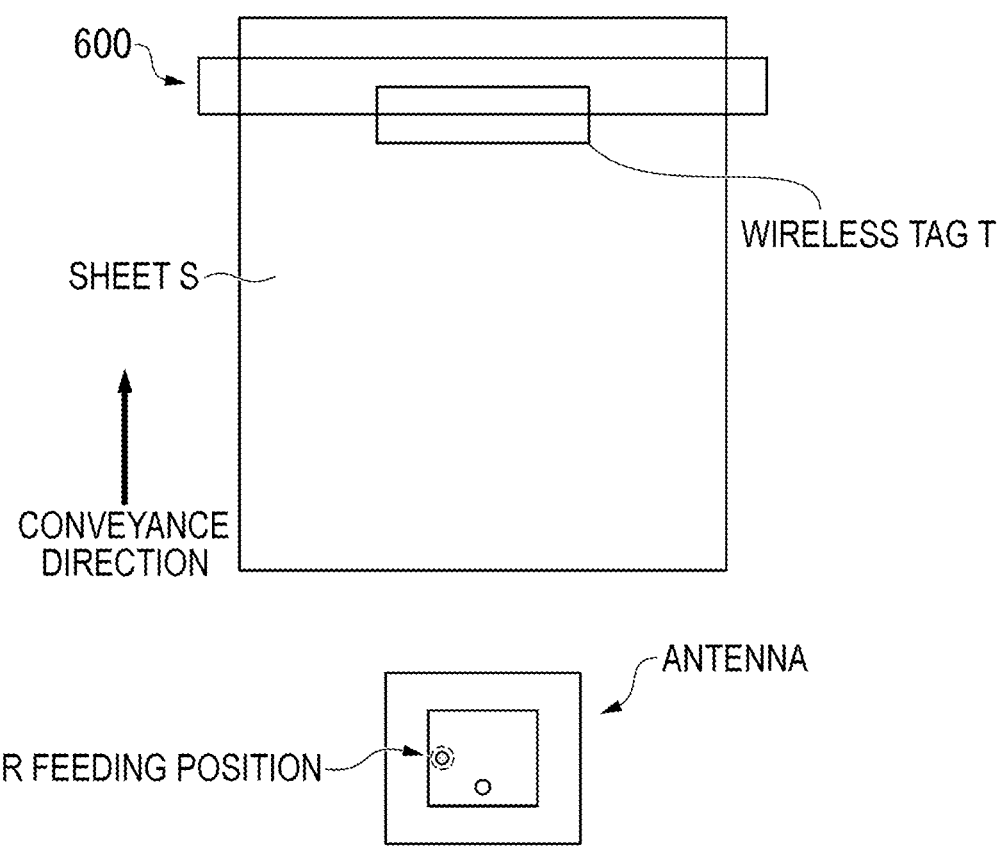
FIG. 3 is a diagram illustrating a positional relation between a sheet, a photoelectric device, and a wireless tag.

FIGS. 3 and 4 are diagrams illustrating a positional relation between the sheet, the photoelectric device 600, and a wireless tag. For easy understanding, FIGS. 3 and 4 illustrate a wireless tag T having a size relatively larger than the actual size with respect to the sheet S.

As illustrated in FIGS. 3 and 4, there are two orientation types for a wireless tag T being provided on a sheet S. One is an orthogonal orientation (referred to as an "orthogonal position") for which the conveyance direction of the sheet S is orthogonal to a longitudinal direction of the wireless tag, as illustrated in FIG. 3. The other orientation type (referred to as a "parallel position" below) for which the conveyance direction of the sheet S is parallel to the longitudinal direction of the wireless tag, as illustrated in FIG. 4.

The polarization direction of radio signals suitable for communicating with the wireless tag T differs depending on the particular orientation of the wireless tag T on the sheet (that is, between the orthogonal position and the parallel position on the sheet). In a case where the wireless tag T is disposed at the orthogonal position, a radio signal having the polarization direction orthogonal to the conveyance direction (also referred to as an "orthogonal polarization direction") is suitable. In a case where the wireless tag T is disposed at the parallel position, a radio signal having the polarization direction parallel to the conveyance direction (also referred to as a "parallel polarization direction") is suitable. Therefore, the wireless tag communication device 201 performs a communication using a radio wave having a polarization direction which desirably differs depending on the orientation of the wireless tag T (e.g., a tag with an orthogonal position or a tag with a parallel position on the sheet). In this context, a radio wave having the orthogonal polarization direction is referred to as an orthogonal radio wave. A radio wave having the parallel polarization direction is referred to as a parallel radio wave.

FIGS. 3 and 4 further illustrate a radio wave emission surface of an antenna provided in the wireless tag communication device 201 that has two different power feeding positions. The wireless tag communication device 201 emits a radio wave having a different polarization direction depending on the power feeding position utilized in generating the radio wave emission. When the power is fed at the power feeding position illustrated in FIG. 3, the wireless tag communication device 201 emits the orthogonal radio wave suitable for communicating with the wireless tag T having the orthogonal position (orientation type). When the power is fed at the power feeding position illustrated in FIG. 4, the wireless tag communication device 201 emits the parallel radio wave suitable for communicating with the wireless tag T having the parallel position (orientation type).

As illustrated in FIGS. 3 and 4, the photoelectric device 600 has a width slightly larger than the lateral width of the sheets. The light transmitting unit 601 (see FIG. 5) emits light to a region in which the wireless tag T is provided on the sheet S being conveyed. Specifically, the light transmitting unit 601 emits light over the entire sheet S width at once. The light receiving unit 602 (see FIG. 5) receives light that has passed through the sheet S.

Figure 5:
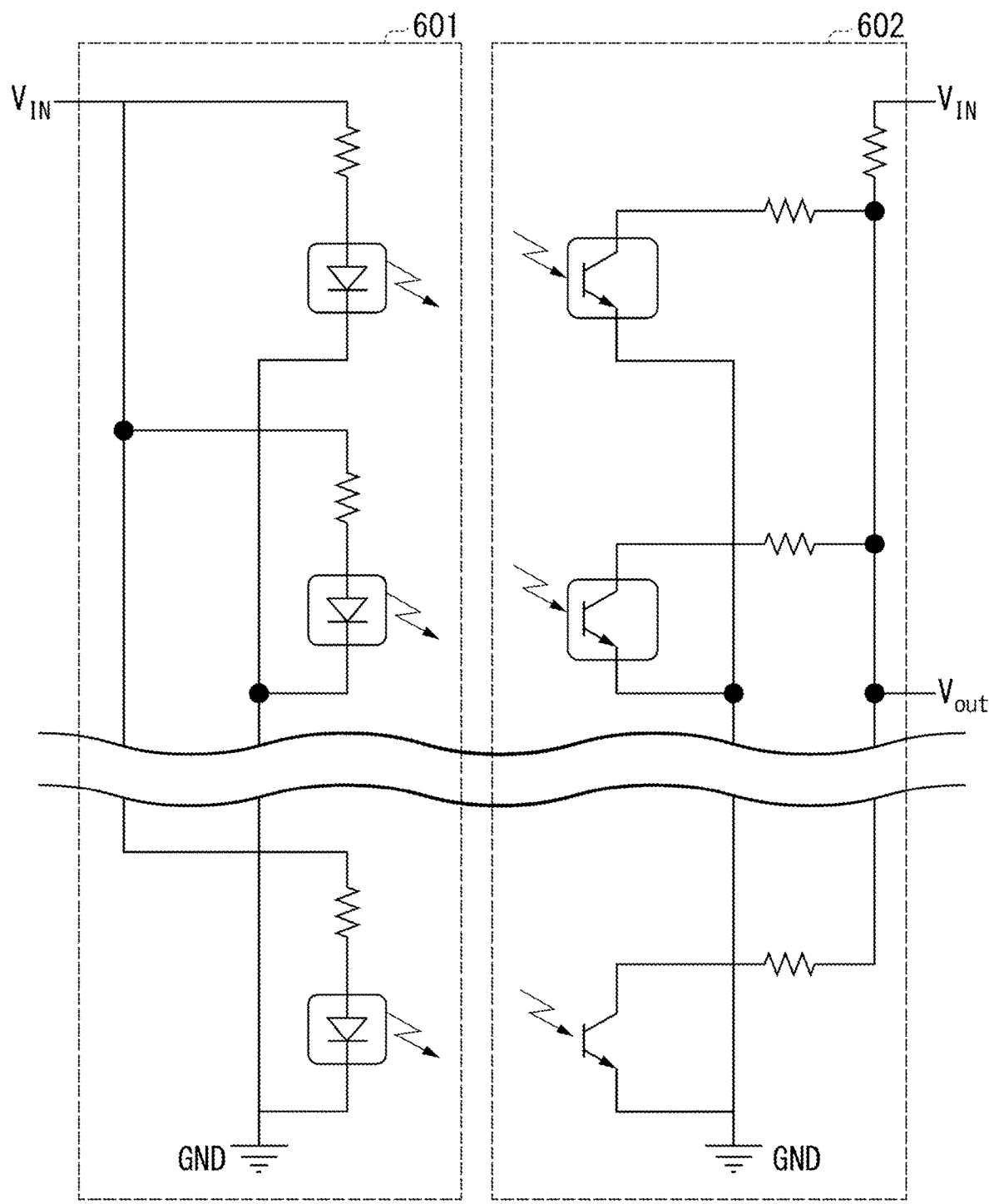
FIG. 5 is a diagram illustrating a configuration of a photoelectric device according to an embodiment.

FIG. 5 is a diagram illustrating the configuration of the photoelectric device 600. As illustrated in FIG. 5, a light emitting unit 601 is a light source array in which a plurality of light emitting elements are arranged along a certain direction. The light emitting element emits an infrared ray having a wavelength of 950 nanometers, for example. In the light receiving unit 602, a plurality of light receiving elements are arranged along the certain direction. Each light receiving element is disposed to face the corresponding light emitting element. The light receiving element is configured not to receive light other than light from the corresponding light emitting element. When the amount of the light received by the light receiving element decreases, a voltage Vout output from the light receiving element increases. That is, when the light is blocked by the wireless tag T, the output voltage Vout becomes larger.

The image forming control unit 100 performs sampling of the voltage Vout at predetermined intervals. Thus, the image forming control unit 100 is capable of acquiring information indicating a light reception state.

Figure 6:
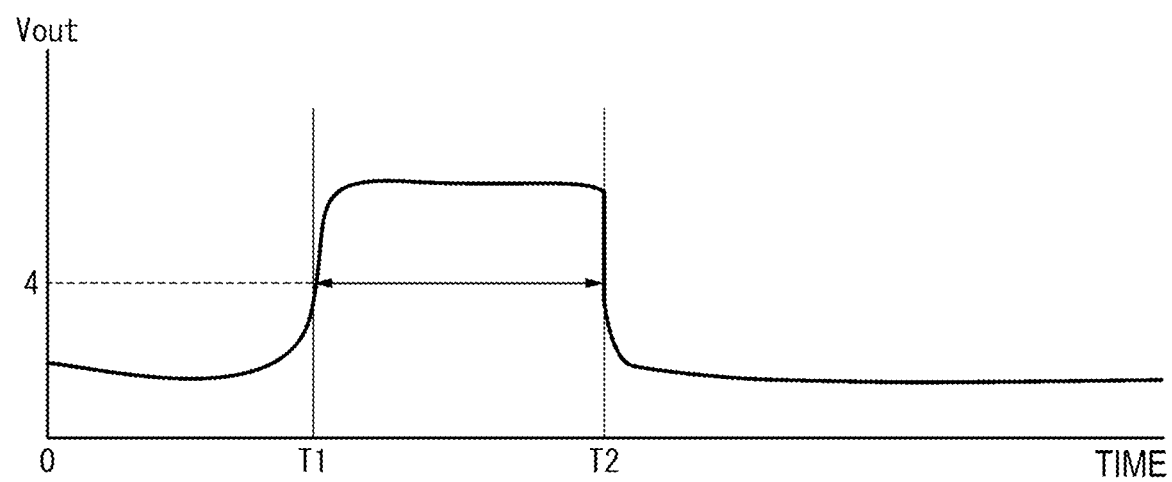
FIG. 6 is a graph illustrating a voltage measured when a wireless tag is disposed at an orthogonal position.
Figure 7:
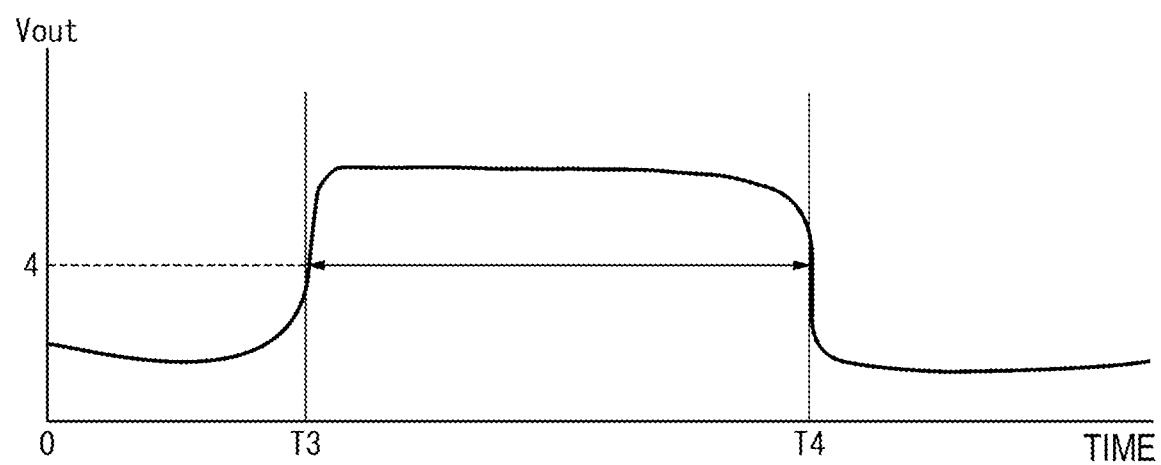
FIG. 7 is a graph illustrating a voltage measured when a wireless tag is disposed at a parallel position.

FIG. 6 is a graph illustrating an example of the voltage Vout measured when the wireless tag T is disposed at the orthogonal position. FIG. 7 is a graph illustrating an example of the voltage Vout measured when the wireless tag T is disposed at the parallel position.

In the graphs illustrated in FIGS. 6 and 7, the vertical axis indicates the output voltage Vout, and the horizontal axis indicates time. The origin 0 indicates a conveyance start timing of the sheet S. In an embodiment, when the voltage Vout is equal to or larger than 4 V, it is determined that light is blocked by the wireless tag T.

As illustrated in FIG. 6, when the wireless tag T is disposed at the orthogonal position, the voltage becomes equal to or larger than 4 V at timing T1 and becomes smaller than 4 V at timing T2. As illustrated in FIG. 7, when the wireless tag T is disposed at the parallel position, the voltage becomes equal to or larger than 4 V at timing T3 and becomes smaller than 4 V at timing T4.

As described above, the form of the light reception signal differs between the case where the wireless tag T is disposed at the orthogonal position and the case where the wireless tag T is disposed at the parallel position. Specifically, the time for which the voltage is maintained equal to or larger than 4 V is less for a wireless tag T disposed at the orthogonal position than for a wireless tag T disposed at the parallel position. That is, T2−T1<T4−T3, when T1 and T2 relate to a light reception signal for an orthogonal orientated wireless tag and T3 and T4 relate to a parallel orientated wireless tag.

The image forming control unit 100 transmits collected light reception information to the wireless tag communication device 201. The light reception information indicates the light reception state of light received by the light receiving unit 602. In this context, there are two different types of light reception information. One type is information indicating the level of the voltage Vout (corresponding to the light reception by the light receiving unit 602) in time series (also referred to as "time series information" below). The other type is information indicating the total time for which the light was blocked by the wireless tag T (also referred to as "light blocking time information" below). The image forming control unit 100 transmits at least one of these light reception information types to the wireless tag communication device 201.

The wireless tag communication device 201 stores reference information in advance in the storage device 211 to compare to the received light reception information. The reference information is used for setting the polarization direction of the radio wave from the communication interface device 212 to communication with the wireless tag T. The reference information corresponding to each of the two different types of light reception information will be described further below.

Figures 8, 9:
FIG. 8 depicts example time series information and reference information.
FIG. 9 depicts example light blocking time information and reference information.

FIG. 8 is a diagram illustrating the time series information and reference information corresponding to the time series information. The time series information is data obtained by sampling the voltage Vout n times from the conveyance start time for the sheet S to an end conveyance time. The voltage Vout sampled n times (1 to n times) at fixed intervals in this example. The sampling end time is selected to be some time after the time T4 illustrated in FIG. 7, such that it is possible to observe the case where the wireless tag T is disposed at the parallel position.

An example of selecting the sampling end time will be described. The conveyance speed of the sheet S is, for example, 225 mm per second, and the length of the wireless tag T in the longitudinal direction is 15 mm. Thus, it takes about 66.7 milliseconds for the wireless tag T to pass by the photoelectric device 600 when the wireless tag T is disposed at the parallel position. Thus, for example, the sampling end time is set to be greater than 66.7 milliseconds from the conveyance start timing with some additional margin for errors and variations (for example, sampling period is at least 70 milliseconds with the added margin).

The reference information corresponding to the time series information indicates the voltage Vout measured n times from the conveyance start timing of the sheet S to a predetermined timing when the wireless tag is disposed at the parallel position. The reference information is determined in advance based on a result of experiment. For example, a sheet may be conveyed several times and the results averaged or the like.

When the time series information is acquired from the image forming control unit 100, the wireless tag communication device 201 compares the acquired time series information to the reference information. The wireless tag communication device 201 determines the polarization direction of the radio wave for communicating with the wireless tag according to the comparison result.

The wireless tag communication device 201 performs the comparison, for example, by obtaining a correlation coefficient between the time series information and the reference information. When the obtained correlation coefficient is equal to or more than, for example, 0.8, the wireless tag communication device 201 determines that the time series information is similar to the reference information.

Thus, when the obtained correlation coefficient is equal to or more than, for example, 0.8, the wireless tag communication device 201 determines that the wireless tag is provided at the parallel position, as the comparison result. Thus, the wireless tag communication device 201 determines the polarization direction to the parallel polarization direction. Accordingly, the communication with the wireless tag T is performed with the parallel radio wave.

When the obtained correlation coefficient is smaller than 0.8, the wireless tag communication device 201 determines that the time series information is not similar to the reference information. When the obtained correlation coefficient is, for example, smaller than 0.8, the wireless tag communication device 201 determines that the wireless tag is provided at the orthogonal position, as the comparison result. Thus, the wireless tag communication device 201 determines the polarization direction to the orthogonal polarization direction. Accordingly, the communication is performed with the orthogonal radio wave.

FIG. 9 is a diagram illustrating light blocking time information Ts and reference information Ta corresponding to the light blocking time information Ts. The light blocking time information indicates a time during which Vout is maintained equal to or lager than 4 V. For example, Ts=T2−T1 in a case of FIG. 6, and Ts=T4−T3 in a case of FIG. 7.

The reference information Ta corresponding to the light blocking time information Ts may be used for determining whether the wireless tag is disposed at the parallel position, when the light blocking time information Ts is equal to or larger than the reference information Ta.

An example of determining the reference information Ta will be described. Firstly, an average value of the time is set to AT1, during which Vout obtained when the sheet S is conveyed plural times in a case where the wireless tag is disposed at the parallel position, is maintained equal to or larger than 4 V. Then, an average value of the time is set to AT2, during which Vout obtained when the sheet S is conveyed plural times in a case where the wireless tag is disposed at the orthogonal position is maintained equal to or larger than 4 V. Ta is set to a value intermediate between AT1 and AT2. That is, Ta is set to (AT1+AT2)/2. As such, Ta is determined in advance.

When the light blocking time information is acquired from the image forming control unit 100, the wireless tag communication device 201 compares the acquired light blocking time information to the reference information. The wireless tag communication device 201 determines the polarization direction of the radio wave for communicating with the wireless tag according to the comparison result.

The wireless tag communication device 201 compares the light blocking time information Ts to the reference information Ta. When the light blocking time information Ts is equal to or larger than the reference information Ta, the wireless tag communication device 201 determines that the wireless tag is provided at the parallel position, as a comparison result. Thus, the wireless tag communication device 201 determines the polarization direction to the parallel polarization direction. Accordingly, the communication is performed with the parallel radio wave.

When the light blocking time information Ts is smaller than the reference information Ta, the wireless tag communication device 201 determines that the wireless tag is disposed at the orthogonal position, as the comparison result. Thus, the wireless tag communication device 201 determines the polarization direction to the orthogonal polarization direction. Accordingly, the communication is performed with the orthogonal radio wave.

Figure 10:
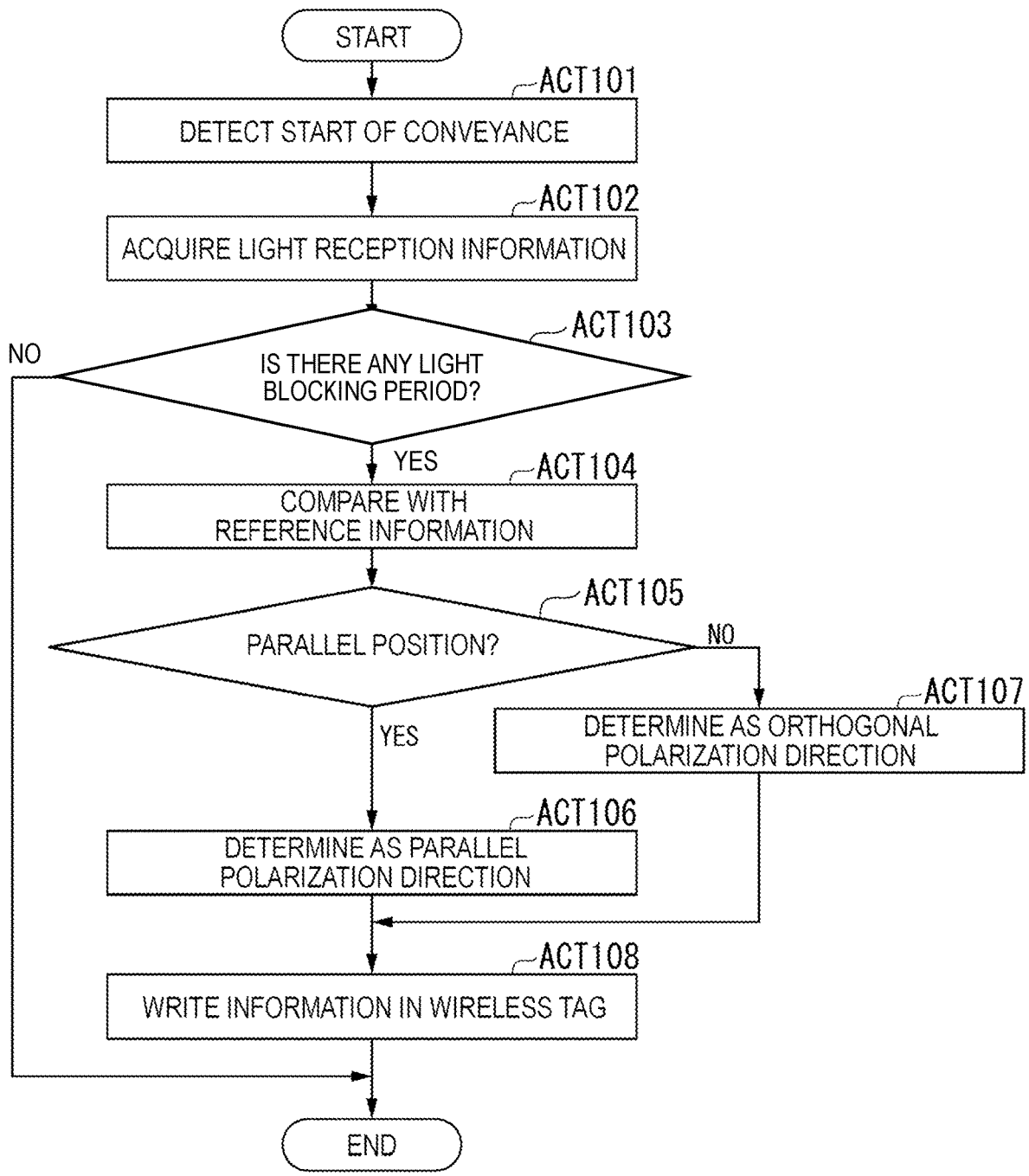
FIG. 10 is a flowchart of a processing flow executed by a wireless tag communication device according to an embodiment.

FIG. 10 is a flowchart of a processing flow of the wireless tag communication device 201. The tag control unit 220 detects the conveyance start of the sheet S (ACT101). The conveyance start is detected, for example, by a notification from the image forming control unit 100. Then, the tag control unit 220 acquires light reception information from the image forming control unit 100 (ACT102). The tag control unit 220 determines whether there is any light blocking period (ACT103).

If no detected value is equal to or larger than 4 V in acquired time series information, the tag control unit 220 determines that there was no light blocking period. Likewise, when the light blocking time information is 0, the tag control unit 220 may determine that there was no light blocking period.

When the tag control unit 220 determines that there has been no light blocking period (ACT103: NO), the tag control unit 220 determines that a sheet on which a wireless tag has not been provided (e.g., a standard sheet of paper) is being conveyed, and ends the processing without writing information in the wireless tag.

When the tag control unit 220 determines that there is a light blocking period (ACT103: YES), the tag control unit 220 next compares with reference information (ACT104). As a result of the comparison to the reference information, the tag control unit 220 determines whether the wireless tag is disposed at the parallel position (ACT105).

When the tag control unit 220 determines that the wireless tag is disposed at the parallel position (ACT105: YES), the tag control unit 220 determines the polarization direction to be the parallel polarization direction (ACT106). The tag control unit 220 performs the communication with the wireless tag using a parallel radio wave to write information in the wireless tag (ACT108), and then ends the processing.

When the tag control unit 220 determine that the wireless tag is not disposed at the parallel position (ACT105: NO), the tag control unit 220 determines the polarization direction to be the orthogonal polarization direction (ACT107). The tag control unit 220 performs the communication with the wireless tag using an orthogonal radio wave to write information in the wireless tag (ACT108), and then ends the processing.

According to the embodiments described above, it is possible to determine the appropriate polarization direction without any dedicated device outside the printer unit 18 for detecting the polarization direction. The processes other than ACT108 in the processing illustrated in FIG. 10 may be performed by another device, for example, a personal computer (PC). Here, the PC acquires the light reception information from the image forming control unit 100. The PC may refer to the reference information. The PC notifies the wireless tag communication device 201 of the determined polarization direction. The wireless tag communication device 201 communicates with the wireless tag with the radio wave having the polarization direction of which the notification is received, to write information in the wireless tag.

In the aforementioned embodiments, whether light is blocked by the wireless tag is determined. Therefore, the position of the wireless tag on the sheet S can be identified without any additional process such as making holes in the sheet. A commercially available wireless tag can be used, and a custom-made wireless tag is not necessary.

In the aforementioned embodiments, since the polarization direction is determined by the comparison to the reference information, it is possible to determine the polarization direction with higher accuracy than when there is no comparison to reference information. In the embodiments, the image forming control unit 100 may transmit only one of the two types of light reception information to the wireless tag communication device 201. That is, the image forming control unit 100 may be configured to be capable of selecting and transmitting either of the two types of light reception information or may be capable of transmitting only one type of light reception information.

In the above-described embodiments, when a wireless tag having a different size is provided on a sheet, the reference information may be altered or set according to the size. Specifically, it may be assumed that the wireless tag has one of a large size, a medium size, or a small size, which may correspond to standardized or otherwise commonly available tag sizes. In such a case, the wireless tag communication device 201 can store reference information for the large size, reference information for the medium size, and reference information for the small size in the storage device 211 in advance.

The wireless tag communication device 201 may compare light reception information to the three types of stored reference information and three correlation corresponding coefficients can be obtained. When at least one of the three obtained correlation coefficients is equal to or more than 0.8, the wireless tag communication device 201 can determine that the light reception information is substantially similar to one of the pre-stored reference information sets.

As described above, when a plurality of sizes is possible for the wireless tag, the wireless tag communication device 201 may store reference information for each size as appropriate. The wireless tag communication device 201 may compare light reception information to all the available or otherwise provided types of reference information.

In some examples, the expected size of the wireless tag may be set by a user in advance. Here, the wireless tag communication device 201 compares light reception information to reference information as set for the expected size of the wireless tag by the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device, comprising:
a communication interface device configured to communicate with a wireless tag attached to or included in a sheet conveyed along a conveyance direction in a printer; and
a controller configured to:
acquire light reception information indicating a time period in which light emitted towards the sheet has been blocked by the wireless tag during conveyance of the sheet,
determine an orientation direction of the wireless tag with respect to the conveyance direction based on a comparison of the acquired light reception information to reference information,
select a polarization direction of a radio wave to be transmitted to the wireless tag based on the determined orientation direction of the wireless tag, and
control the communication interface device to transmit the radio wave having the selected polarization direction towards the wireless tag.

2. The wireless tag communication device according to claim 1, wherein the light reception information further indicates changes in an amount of the light that has passed through the sheet during the conveyance of the sheet.

3. The wireless tag communication device according to claim 2, wherein the amount of the light is represented by a voltage output by a light receiving unit of the printer.

4. The wireless tag communication device according to claim 2, wherein
the reference information indicates changes in an amount of the light that has passed through the sheet during the conveyance of the sheet when the orientation direction of the wireless tag is parallel to the conveyance direction, and the controller determines the orientation direction of the wireless tag to be a first direction parallel to the conveyance direction when the acquired light reception information matches the reference information.

5. The wireless tag communication device according to claim 4, wherein the controller determines the orientation direction of the wireless tag to be a second direction that is perpendicular to the conveyance direction when the acquired light reception information does not match the reference information.

6. The wireless tag communication device according to claim 1, wherein the reference information indicates an intermediate value between a time period for which the light is blocked by the wireless tag during the conveyance of the sheet when the orientation direction of the wireless tag is perpendicular to the conveyance direction and a time period for which the light is blocked during the conveyance of the sheet when the direction of the wireless tag is parallel to the conveyance direction.

7. The wireless tag communication device according to claim 6, wherein the controller determines the orientation direction of the wireless tag to be parallel to the conveyance direction when the time period indicated by the acquired light reception information is greater than or equal to the intermediate value indicated by the reference information.

8. The wireless tag communication device according to claim 7, wherein the controller determines the orientation direction of the wireless tag to be perpendicular to the conveyance direction when the time period indicated by the acquired light reception information is less than the intermediate value indicated by the reference information.

9. The wireless tag communication device according to claim 1, wherein the direction of the wireless tag is one of a first direction parallel to the conveyance direction or a second direction perpendicular to the conveyance direction.

10. The wireless tag communication device according to claim 9, wherein the controller determines the polarization direction of the radio wave to correspond to first direction when the determined orientation direction of the wireless tag is the first direction, and correspond to the second direction when the determined orientation direction of the wireless tag is the second direction.

11. An image forming apparatus, comprising:
a printer that includes a photoelectric device configured to emit light towards a sheet and detect the light that has passed through the sheet during the conveyance of the sheet;
a controller configured to generate, based on the detected light, light reception information indicating a time period in which the light has been blocked during the conveyance of the sheet; and
a wireless tag communication device configured to:
identify an orientation direction of a wireless tag in the sheet based on a comparison the light reception information to reference information,
select a polarization direction of a radio wave to be transmitted to the wireless tag based on the determined orientation direction of the wireless tag, and transmit the radio wave having the selected polarization direction.

12. The image forming apparatus according to claim 11, wherein the light reception information further indicates changes in an amount of the light that has passed through the sheet during the conveyance of the sheet.

13. The image forming apparatus according to claim 12, wherein the amount of the light is represented by a voltage output by a light receiving unit of the photoelectric device.

14. The image forming apparatus according to claim 12, wherein
the reference information indicates changes in an amount of the light that passes through the sheet during the conveyance of the sheet when the orientation direction of the wireless tag is parallel to the conveyance direction, and
the wireless tag communication device identifies the orientation direction of the wireless tag to be parallel to the conveyance direction when the acquired light reception information substantially matches the reference information.

15. The image forming apparatus according to claim 14, wherein the wireless tag communication device identifies the orientation direction of the wireless tag to be perpendicular to the conveyance direction when the acquired light reception information does not substantially match the reference information.

16. The image forming apparatus according to claim 11, wherein the reference information indicates an intermediate value between a time period for which the light is blocked by the wireless tag during the conveyance of the sheet when the orientation direction of the wireless tag is perpendicular to the conveyance direction and a time period for which the light has is by the wireless tag during the conveyance of the sheet when the orientation direction of the wireless tag is parallel to the conveyance direction.

17. The image forming apparatus according to claim 16, wherein the wireless tag communication device identifies the orientation direction of the wireless tag to be parallel to the conveyance direction when the time period indicated by the acquired light reception information is greater than or equal to the intermediate value indicated by the reference information.

18. The image forming apparatus according to claim 17, wherein the wireless tag communication device determines the orientation direction of the wireless tag to be perpendicular to the conveyance direction when the time period indicated by the acquired light reception information is less than the intermediate value indicated by the reference information.

19. The image forming apparatus according to claim 11, wherein
the orientation direction of the wireless tag is either a first direction parallel to the conveyance direction or a second direction perpendicular to the conveyance direction, and
the wireless tag communication device selects the polarization direction of the radio wave to correspond to the first direction when the identified orientation direction of the wireless tag is the first direction and to correspond to the second direction when the identified orientation direction of the wireless tag is the second direction.

20. A control method for a wireless tag communication device configured to communicate with a wireless tag attached to or included in a sheet conveyed along a conveyance direction in a printer, the method comprising:
acquiring light reception information indicating a time period for which light emitted towards the sheet is blocked by the wireless tag during conveyance of the sheet;

determining an orientation direction of the wireless tag with respect to the conveyance direction based on a comparison of the acquired light reception information to reference information;

selecting a polarization direction of a radio wave to be transmitted towards the wireless tag based on the determined orientation direction of the wireless tag; and transmitting the radio wave having the selected polarization direction towards the wireless tag.

* * * * *